United States Patent [19]

Nodelman et al.

[11] Patent Number: 5,847,014
[45] Date of Patent: Dec. 8, 1998

[54] WATER BLOWN, ENERGY ABSORBING FOAMS

[75] Inventors: Neil H. Nodelman, Pittsburgh; David D. Steppan, Gibsonia; Mark A. Davolio, Clairsville; David F. Sounik, Bethel Park; Alan D. Bushmire, McDonald, all of Pa.

[73] Assignee: Bayer Corporation, Pittsburgh, Pa.

[21] Appl. No.: 842,697

[22] Filed: Apr. 15, 1997

[51] Int. Cl.$^6$ .................................................. C08G 18/22
[52] U.S. Cl. ........................ 521/110; 521/163; 521/167; 521/174; 521/902; 521/125
[58] Field of Search ................................. 521/110, 125, 521/163, 167, 174, 902

[56] References Cited

U.S. PATENT DOCUMENTS

| | | | |
|---|---|---|---|
| 3,926,866 | 12/1975 | Komatsu et al. | 260/2.5 AH |
| 4,116,893 | 9/1978 | Flanagan | 521/137 |
| 4,190,712 | 2/1980 | Flanagan | 521/137 |
| 4,212,954 | 7/1980 | Nomura et al. | 521/159 |
| 4,247,656 | 1/1981 | Janssen et al. | 521/174 |
| 4,282,330 | 8/1981 | Austin | 521/118 |
| 4,371,629 | 2/1983 | Austin | 521/115 |
| 4,614,754 | 9/1986 | Christman | 521/167 |
| 4,866,102 | 9/1989 | Pray et al. | 521/137 |
| 4,981,880 | 1/1991 | Lehmann et al. | 521/174 |
| 5,143,941 | 9/1992 | Rossio et al. | 521/51 |
| 5,167,884 | 12/1992 | Rossio et al. | 264/45.5 |
| 5,187,204 | 2/1993 | Jackson et al. | 521/111 |
| 5,216,041 | 6/1993 | Rossio et al. | 521/137 |
| 5,232,957 | 8/1993 | Pritchard et al. | 521/174 |
| 5,449,700 | 9/1995 | Milliren et al. | 521/167 |
| 5,489,618 | 2/1996 | Gerkin | 521/128 |

*Primary Examiner*—Rachel Gorr
*Attorney, Agent, or Firm*—Joseph C. Gil; Noland J. Cheung

[57] ABSTRACT

The present invention is directed to an isocyanate reactive mixture comprising from about 17 to about 85% by weight of one or more non-filled polyether polyols having a hydroxyl functionality of from 1.5 to 3 and molecular weights of from 1,500 to 8,000; from about 12 to about 80% by weight of one or more non-tertiary amine containing polyether polyols having a hydroxyl functionality of from 3 to 8 and a molecular weight of from 150 to 1,000; from about 0 to about 4% by weight of one or more primary or secondary diamines or amino alcohols and from 3 to about 12% by weight of water. The invention is also directed to a water-blown, energy absorbing foams made from the isocyanate reactive mixture.

10 Claims, No Drawings

WATER BLOWN, ENERGY ABSORBING FOAMS

BACKGROUND OF THE INVENTION

Energy absorbing foams based upon urethane chemistry are known in the art. The early literature generally utilized halocarbon blowing agents (see, e.g., U.S. Pat. No. 3,926,866). A significant number of patents have issued relating to water blown energy absorbing foams based upon polyols ("filled polyols") prepared by polymerizing styrene/acrylonitrile monomer mixtures in polyethers (see, e.g., U.S. Pat. Nos. 4,116,893, 4,190,712, 4,212,954, 4,866,102, 5,216,041 and 5,232,957). Other patented technology describes the use of relatively low molecular weight crosslinkers (see, e.g., U.S. Pat. Nos. 4,282,330, 5,143,941, and 5,167,884) or the use of various polyols, such as ethylene oxide adducts of Mannich condensates (U.S. Pat. No. 4,371,629), alkoxylated toluene diamine (U.S. Pat. No. 4,614,754), or polyols derived from propylene glycol or ethylene diamine (U.S. Pat. No. 5,187,204). Other patented technology describes the water blown energy absorbing foams as a flexible foam (U.S. Pat. Nos. 4,981,880 and 5,489,618).

While systems based upon some of the patents noted above have been used commercially, the search continues for systems which will produce energy absorbing foams which will meet a variety of specifications such as specifications required by Ford, and which also meet commercial production processing requirements of a mold closing of greater than seventeen (17) seconds and at the most, a three (3) minute demold time. Systems having a mold closing of less than twelve (12) seconds are known (U.S. Pat. No. 5,449,700). Such systems, however, do not use cell-opening surfactants nor do such systems require high molecular weight polyether polyols. "Mold closing" is defined as the time from the start of the introduction of the foamable reactants into the mold until the mold is closed. "Demold time" is defined as the time from the start of the introduction of the foamable reactants into the mold until the finished part is removed from the mold.

SUMMARY OF THE INVENTION

The present invention is directed to an isocyanate reactive mixture and to a foam produced therefrom. More particularly, the isocyanate reactive mixture of the present invention comprises:

a) from about 17 to about 85% by weight of one or more non-filled polyether polyols having a hydroxyl functionality of from 1.5 to 3 and molecular weights of from 1,500 to 8,000;

b) from about 12 to about 80% by weight of one or more non-tertiary amine containing polyether polyols having a hydroxyl functionality of from 3 to 8 and a molecular weight of from 150 to 1,000;

c) from about 0 to about 4% by weight of one or more secondary or primary diamines or amino alcohols; and d) from about 3 to about 12% by weight of water; wherein the percents by weight are based upon the total weight of the isocyanate reactive mixture and wherein the percents by weight total 100%.

In addition, the present invention is directed to a water blown energy absorbing foam produced by reacting:

A) the above-described isocyanate reactive mixture;

B) a polymethylene poly(phenyl isocyanate) containing from about 40 to about 85% by weight of methylene bis(phenyl isocyanate) and having an isocyanate group content of from about 20 to about 35% by weight, with the amount of said isocyanate being such that the isocyanate index of the mixture of all the isocyanate reactive components and said isocyanate is from about 150 to about 250;

C) from about 0.3 to about 4 parts by weight per 100 parts by weight of component A) of a silicone cell-opening surfactant;

D) from about 2 to about 13 parts by weight per 100 parts by weight of component A) of at least two different trimerization catalysts;

E) from about 0.5 to about 5.5 parts by weight per 100 parts by weight of component A) of at least one or more tertiary amine catalysts for catalyzing the reaction between isocyanate groups and hydroxyl groups.

An object of the present invention is to develop a novel polyol mixture which allows for the production of energy absorbing foams which meet the above-noted Ford specification and which meet the commercial production requirements of greater than seventeen (17) seconds mold closing time and less than a three (3) minutes demold time.

A further object of the present invention is to allow for the use of a wide range of water levels to produce molded isocyanurate-group containing ("trimer") foams of varying densities, which exhibit good dimensional stability and a very uniform type of energy absorption.

Another object of the present invention is to allow the water level to be easily adjusted such that the foam density can be adjusted to allow the foam to meet the above-noted Ford specification.

Another object of the present invention is to avoid the use of tertiary amine polyols which contribute to the speed of reactivity of the foam which tend to increase closed cell content and therefore increase foam pressure in the mold.

A further object of the present invention is to not require the use of expensive filled polyols while still allowing for the production of foams displaying very low molding pressures with good moldability.

DETAILED DESCRIPTION OF THE INVENTION

The foams of the present invention are water blown, energy absorbing foams broadly produced by reacting a specified isocyanate reactive mixture with a polymethylene poly(phenyl isocyanate).

The isocyanate reactive mixture A) comprises the following specific components: a) a non-filled polyether polyol having a hydroxyl functionality of from 1.5 to 3 and a molecular weight ranging from 1,500 to 8,000, and having a hydroxyl number of from 10–112; b) a non-tertiary amine containing polyether polyol having a hydroxyl functionality of from 3 to 8 and a molecular weight of from 150 to 11000 and having a hydroxyl number from 168–1250; c) optionally, one or more primary or secondary diamines or amino alcohols and d) water in the amount ranging from about 3 to about 12 percent by weight.

The polyetherpolyols used in components A)a) and A)b) and their methods of manufacture are generally known in the art. Polyhydroxy functional starters such as glycerine, propylene glycol, sucrose are reacted with either ethylene oxide, propylene oxide, or both in either sequential or random blocks using basic catalysts like KOH.

The primary or secondary amino alcohols are produced by reaction of ammonia (1 mole) with either ethylene or propylene oxide (1 or 2 moles). Primary diamines such as diethyltoluenediamine ("DEDTA") are produced by dinitrating toluene followed by reduction to the diamine. This is followed by the Friedel Crafts ethylation of the ring. Suitable primary or secondary diamines or amino alcohols include diethanolamine, monoethanolamine, DETDA and 2-Methyl-1,5 pentanediamine (available from DuPont as DYTEK A).

The polymethylene poly(phenyl isocyanates) useful herein are known in the art and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. The isocyanates useful herein contain from about 40 to about 85% by weight of methylene bis(phenyl isocyanate) and have an isocyanate group content of from about 20 to about 35% by weight, preferably from about 30 to about 35% by weight, and most preferably from about 31 to about 33% by weight. As noted above, the isocyanate index of the total system is from about 150 to about 250.

Water is used in an amount ranging from about 3 to about 12 percent by weight, and preferably from about 4 to 10 percent by weight, The silicone cell-opening surfactants, which are used in amounts of from about 0.3 to about 4 percent by weight are known in the art. In a preferred embodiment, the silicone cell-opening surfactants are used in an amount of about 0.5 to about 2.0 percent by weight. Polyether siloxanes are particularly suitable silicone cell-opening surfactants; especially useful are those which are water soluble. These compounds generally have a polydimethyl siloxane group attached to a copolymer of ethylene oxide and propylene oxide. Examples of useful cell-opening silicone surfactants include those sold as DC-5244 from Air Products, L-3801 and L-3803 from WITCO. Also useful are the known polysiloxane surfactants generally used in the polyurethane art.

The reaction mixture must also contain at least two different trimerization catalysts in an amount of from about 2 to about 13 percent by weight. Preferably, the amount of trimerization catalysts in the reaction mixture is from about 3 to about 10 percent by weight. Trimerization catalysts (i.e., catalysts which promote the self-polymerization reaction of isocyanate groups) are known in the art. Suitable trimerization catalysts include strong bases such as quaternary ammonium hydroxides (such as benzyl trimethylammonium hydroxide), alkali metal hydroxides (such as potassium hydroxide), and alkali metal alkoxides (such as sodium methoxide). Other suitable catalysts include materials of a more weakly basic nature such as alkali metal salts of carboxylic acids (such as sodium acetate, potassium acetate, potassium 2-ethylhexoate, potassium adipate and sodium benzoate), N-alkyl-ethylenenimines, tris(3-dimethyl-aminopropyl)hexahydro-s-triazine, potassium phthalimide and tertiary amino phenols such as are described in U.S. Pat. No. 4,169,921 (such as 2,4,6-tris-(N,N-dimethylaminomethyl)-phenol). Examples of commercially available trimerization catalysts include potassium acetate in ethylene glycol sold as Polycat 46 from Air Products; potassium 2-ethylhexoate in diethylene glycol sold as Dabco K-15 from Air Products; a blend of quaternary ammonium formate and a tertiary amine sold as DABCO TMR-5 from Air Products; hexa-hydro-1,3,5-tris(3-dimethylaminopropyl)-triazine sold as Pel-Cat 9640 from Ele Company and Polycat 41 from Air Products; 2,4,6-tris-(N,N-dimethyl-aminomethyl)-phenol sold as Pel-Cat 9529 from Ele and TMR-30 from Air Products; Hexchem 977 from Hexchem and Pel-Cat 9540A from Ele.

The reaction mixture can also contain at least one tertiary amine catalyst for catalyzing the reaction between isocyanate groups and hydroxyl groups (i.e., a urethane catalyst) in an amount of from about 0.5 to about 5.5 percent by weight. In a preferred embodiment, the tertiary amine catalyst in the reaction mixture ranges between about 1 percent to about by 4 percent by weight. The urethane catalysts are generally known and include tertiary amines such as triethylamine, tributylamine, N-methylmorpholine, N-ethyl-morpholine, N-coco-morpholine, N,N,N',N"-tetramethyl-ethylene-diamine, 1,4-diaza-bicyclo-(2,2,2)-octane, N-methyl-N'-dimethyl-amino-ethylpiperazine, N,N-dimethylbenzylamine, bis-(N,N-diethyl-aminoethyl)-adipate, N,N-diethylbenzylamine, pentamethyldiethylenetriamine, N,N-dimethyl-cyclohexylamine, N,N,N',N'-tetramethyl-1,3-butanediamine, N,N-dimethyl-β-phenylethylamine, 1,2-dimethylimidazole, 2-methylimidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylamino-ethyltetramethyldisiloxane.

The reaction mixture may also contain a sufficient amount of carboxylic acid to neutralize the tertiary amine catalysts. In addition, an excess amount of carboxylic acid ranging from 10 to 100 % of the total equivalents of the carboxylate trimer catalysts may be added.

According to the present invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Höchtlen, Carl-Hanser-Verlag, Munich, 1966, pages 121 and 205.

The foaming reaction for producing foam products is carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a non-cellular structure (skin) on its surface. According to the present invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungs-schriften Nos. 2,121,670 and 2,307,589.

The invention is further illustrated but is not intended to be limited by the following examples in which all parts and percentages are by weight unless otherwise specified.

EXAMPLES

In the examples which follow, the following materials were used:

A) POLYOL A: a styrene acrylonitrile polymer polyol having a solids content of about 28%, which is commercially available as Arcol E-519 from Arco Chemicals. This polymer polyol has an OH number of about 25.4, a functionality of about 3, and a PO:EO wt. ratio of 81:19.

B) POLYOL B: a styrene acrylonitrile polymer polyol with a 45% solids content. This polymer polyol has an OH number of 28, has a functionality of about 3, and is 100% PO.

C) POLYOL C: a sucrose/propylene glycol initiated-propylene oxide polyether having an average hydroxyl functionality of about 5.24 and having a hydroxyl number of 470.

D) POLYOL D: a glycerin initiated-propylene oxide polyether having a hydroxyl functionality of 3 and having a hydroxyl number of 1050.

E) POLYOL E: a glycerin initiated-propylene oxide polyol having a hydroxyl functionality of 3 and a hydroxyl number of 56.

F) POLYOL F: a glycerin initiated-propylene oxide/ethylene oxide polyether (weight ratio of PO to EO of about 5:1), having a hydroxyl functionality of 3 and a hydroxyl number of 28.

G) POLYOL G: a sucrose/propylene glycol initiated-propylene oxide polyether having an average hydroxyl functionality of about 6.18 and having a hydroxyl number of 340.

H) POLYOL H: a glycerin initiated polyol having a hydroxyl functionality of 3 and a hydroxyl number of 46 and 11% of the oxide weight is from ethylene oxide.

I) POLYOL I: a glycerin/propylene glycol initiated polyether having a functionality of about 2.9 and a hydroxyl number of 56 and 10% of the oxide weight is from ethylene oxide.

J) DEOA-LF: 85% diethanolamine/15% water.

K) DC-5244: A cell opening silicone surfactant commercially available from Air Products.

L) L3801: A cell opening silicone surfactant commercially available from WITCO.

M) L3803: A cell opening silicone surfactant commercially available from WITCO.

N) Dabco X8136: a trimerization catalyst which is a blend of quaternary ammonium formate and a tertiary amine, commercially available from Air Products.

O) Dabco K-15: potassium 2-ethylhexoate in diethylene glycol, commercially available from Air Products.

P) PC-46: Polycat 46, potassium acetate in ethylene glycol, commercially available from Air Products.

Q) NIAX A1: a tertiary amine catalyst (70% solution of bis(dimethylaminoethyl)ether) available from Union Carbide.

R) Dabco 33LV: a 33 percent solution of triethylene diamine. available from Air Products.

S) Dabco TMR-5: a trimerization catalyst which is a blend of quaternary ammonium formate and a tertiary amine, commercially available from Air Products.

T) WATER.

U) 2-Ethylhexanoic acid.

V) ISO1: a polymethylene poly(phenyl isocyanate) containing about 45% by weight diisocyanate, having an isocyanate group content of about 31.5%, an equivalent weight of about 133, and a viscosity of about 200 mPa.s at 25° C., commercially available from Bayer Corporation.

W) ISO2: A polymethylene poly(phenyl isocyanate) having an isocyanate group content of about 32.2% by weight and containing about 58% by weight of diisocyanate, in which the diisocyanate comprised about 13% by weight of 2,4'-methylene bis(phenyl isocyanate) and about 45% by weight of 4,4'-methylene bis(phenyl isocyanate), available commercially as MONDUR 582 from Bayer Corporation.

A high pressure foam machine, used to make the 10"×10"×2.5" molded blocks, was equipped with two (2) REXROTH 12 axial piston pumps and a HENNECKE mQ-8 mixhead. The parts were made in an open-pour process in an aluminum mold. The injection pressure was 135 bar on the polyol side and 145 bar on the isocyanate side. The throughput in the mixhead was maintained at 136 g/sec. The polyol blend was made in the proportions indicated and heated, along with the isocyanate to a temperature of 30° C. The comparative example was run at a 72° C. mold temperature. The examples of the invention were run at a 66° C. mold temperature. All the blocks were demolded after three minutes and Chemtrend RCTW A-6040 was used as the external release agent.

The formulations used were as reported in Table 1 (all amounts are in parts by weight). Example #1 is a comparative example. It is a filled polyol system with an eleven (11) second mold closing ("top of cup time"). Example #9, which is the same formulation as Example #1, is run at the same density (2.0 pcf) as well as at a higher density (2.55 pcf). All of the other examples are run at a 2.0 pcf density, except for Example 6, which is also run at a density of 2.55 pcf. The top of cup reactivity of all of the systems range between 18–21 seconds, a surprisingly 64 to 90% increase over the comparative example. Demold times all remain at 3 minutes, which is the same demold time as shown in the comparative example.

In the sled impact test, 10×10×2.5 in. foam blocks are impacted with a 6" cylindrical head, 43 lb. metal tup, travelling at 12 miles/hr. Force vs. deflection curves are obtained. The maximum force, maximum deflection, and efficiency of energy transfer to the foams are recorded in the table. At the 2.0 pcf core density level, all of the examples exhibit a maximum force of about 2200±100 pounds. All of the maximum deflections are 1.9±0.1 inches. Additionally, all of the foams exhibit about a 90% efficiency. This means that very little rebound is occurring upon impact and that most of the energy is resulting in foam collapse. Examples 6 and 9, at the high density, exhibit similar maximum force (~2400 pounds) and efficiencies (~90%).

TABLE 1

| FORMULATIONS | | | | |
|---|---|---|---|---|
| | 1 | 2 | 3 | 4 |
| Polyol A | 36.1 | | | |
| Polyol B | 31.6 | | | |
| Polyol C | 17 | | | |
| Polyol D | 0.5 | | | |
| Polyol E | | 18 | 18 | 18 |
| Polyol F | | 28.6 | 28.6 | 28.6 |
| Polyol G | | 39.6 | 39.6 | 39.6 |
| DEOA-LF | | 1 | 1 | 1 |
| Glycerine | 1.5 | | | |
| DE-5244 | 0.5 | 1 | | |
| L3801 | | | 1 | |
| L3803 | | | | 1 |
| DABCO X8136 | 3.1 | | | |
| K-15 | 3 | | | |
| DABCO 33-LV | 0.9 | | | |
| DABCO TMR-5 | | 3 | 3 | 3 |
| PC-46 | | 3 | 3 | 3 |

TABLE 1-continued

FORMULATIONS

| | | | | |
|---|---|---|---|---|
| Niax A-1 | 0.5 | 0.3 | 0.3 | 0.3 |
| Water | 6.8 | 6.8 | 6.8 | 6.8 |
| Iso 2 | 269 | | | |
| Iso 1 | | 270 | 270 | 270 |
| PROCESSING | | | | |
| Index | 200 | 180 | 180 | 180 |
| Density (pcf) | 1.99 | 2 | 2.01 | 2.04 |
| SLED IMPACT Cylindrical Head (6") 43 lb. TUP 12 MPH | | | | |
| Max force, lbs. | 2113 | 2338 | 2306 | 2239 |
| Maximum deflection in | 1.9 | 2.03 | 2.02 | 1.92 |
| Efficiency, % | 92.2 | 91.5 | 89 | 89.2 |
| REACTIVITIES | | | | |
| Cream time (sec) | 3 | 5 | 4 | 4 |
| Top of cup (sec) | 11 | 18 | 21 | 21 |
| String gel (sec) | 16 | 24 | 24 | 24 |
| Tack free (sec) | 23 | 34 | 35 | 35 |

| | 5 | 6 | 7 | 8 | 9 | |
|---|---|---|---|---|---|---|
| Polyol G | 42.8 | 39.6 | 42.8 | 39.6 | | |
| Polyol H | 42.8 | | | | | |
| Polyol F | | 28.6 | | 28.6 | | |
| Polyol C | | | | | 17 | |
| Polyol E | | 18 | | 18 | | |
| Polyol D | | | | | 0.5 | |
| Polyol I | | | 42.8 | | | |
| 2-ethylhexanoic acid | | 2.4 | | | | |
| Polyol A | | | | | 36.1 | |
| Polyol B | | | | | 31.6 | |
| Glycerine | | | | | 1.5 | |
| DC 5244 | | | | | 0.5 | |
| DEOA-LF | | 1 | | 1 | | |
| L-3803 | 1.5 | 1 | 1.5 | 1 | | |
| DABCO 33LV | 0.5 | 1 | 0.5 | | 0.9 | |
| DABCO TMR-5 | 3 | | 3 | 3 | | |
| DABCO K-15 | | 3 | | | 3 | |
| Niax A-1 | 0.4 | 0.4 | 0.4 | 0.3 | 0.3 | |
| DABCO X8136 | | | | | 3.1 | |
| PC-46 | 3 | 3 | 3 | 3 | | |
| Water | 6.8 | 6.8 | 6.8 | 6.8 | 6.8 | |
| Iso 1 | 270.9 | 280.6 | 277.1 | 271.7 | | |
| Iso 2 | | | | | 271.1 | |
| PROCESSING | | | | | | |
| Index | 180 | 180 | 180 | 180 | 200 | |
| Density (pcf) | 2.00 | 1.98 2.54 | 1.94 | 2.41 | 2 2.56 | |
| (SLED IMPACT) Cylindrical Head (6") 43 lb. TUP 12 MPH | | | | | | |
| Max force, lbs. | 2264 | 2304 2429 | 2288 | 2343 | 2232 2368 | |
| Maximum deflection, in | 1.91 | 1.84 1.54 | 1.98 | 1.62 | 1.76 2.05 | |
| Efficiency, % | 88.5 | 90.2 88.2 | 90.7 | 89.8 | 92.7 93.5 | |
| REACTIVITIES | | | | | | |
| Cream time (sec) | 5 | 4 | 5 | 4 | | |
| Top of Cup (sec) | 18 | 21 | 18 | 21 | | |
| String gel (sec) | 22 | 24 | 22 | 26 | | |
| Tack free | 34 | 35 | 34 | 39 | | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water blown, energy absorbing foam produced by reacting:

A) an isocyanate reactive mixture comprising:
 a) from about 17 to about 85% by weight of one or more non-filled polyether polyols having a hydroxyl functionality of from 1.5 to 3 and molecular weights of from 1,500 to 8,000;
 b) from about 12 to 80% by weight of one or more non-tertiary amine polyether polyols having a hydroxyl functionality of from 3 to 8 and a molecular weight of from 150 to 1,000;
 c) from about 0 to about 4% by weight of one or more secondary or primary amines or amino alcohols; and
 d) from 3 to about 12% by weight of water; wherein the percents by weight are based upon the total weight of the isocyanate reactive mixture and wherein the percents by weight total 100%, B) a polymethylene poly(phenyl isocyanate) containing from about 40 to about 85% by weight of methylene bis(phenyl isocyanate) and having an isocyanate group content of from about 20 to about 35% by weight, with the amount of said isocyanate B) being such that the isocyanate index of the mixture of all the isocyanate reactive components and said isocyanate is from about 150 to about 250, and C) from about 0.3 to about 4 parts by weight per 100 parts by weight of component A) of a silicone cell-opening surfactant;

D) from about 2 to about 13 parts by weight per 100 parts by weight of component A) of at least two different isocyanate trimerization catalysts, wherein one of the at least two different isocyanate trimerization catalysts is potassium acetate;

E) from 0.5 to about 13 parts by weight per 100 parts by weight of component A) of a catalyst for catalyzing the reaction between isocyanate groups and hydroxyl groups.

2. The foam of claim 1, wherein said amine is selected from the group consisting of diethanolamine, monoethanolamine, diethyltoluenediamine and 2-methyl-1,5 pentanediamine.

3. The foam of claim 1, wherein said amine is diethanolamine.

4. The foam of claim 1, wherein a sufficient amount of carboxylic acid is added to neutralize said component E).

5. The foam of claim 1, wherein the isocyanate group content of component B) is from about 30 to about 35% by weight.

6. The foam of claim 5, wherein said isocyanate group content of component B) is from about 31 to about 33% by weight.

7. The foam of claim 1, wherein said water ranges from about 4 to about 10 percent by weight.

8. The foam of claim 1, wherein said silicone surfactant is from about 0.5 to about 2.0 parts by weight per 100 parts by weight of said component A).

9. The foam of claim 1, wherein said at least two different trimerization catalysts is from about 3 to about 10 parts by weight of said component A).

10. The foam of claim 1, wherein said catalyst for catalyzing reaction between isocyanate groups and hydroxyl groups ranges between about 1 to about 4 parts by weight of said component A).

* * * * *